(12) United States Patent
Suzuki et al.

(10) Patent No.: US 7,678,416 B2
(45) Date of Patent: Mar. 16, 2010

(54) SUBSTRATE COATING METHOD

(75) Inventors: Hiromasa Suzuki, Shizuoka (JP); Shingo Sakagami, Shizuoka (JP); Tomoyuki Goshima, Shizuoka (JP); Tamio Kosaka, Shizuoka (JP)

(73) Assignee: Cataler Corporation, Shizuoka (JP)

( * ) Notice: Subject to any disclaimer, the term of this patent is extended or adjusted under 35 U.S.C. 154(b) by 1017 days.

(21) Appl. No.: 11/293,153

(22) Filed: Dec. 5, 2005

(65) Prior Publication Data

US 2007/0128354 A1  Jun. 7, 2007

(51) Int. Cl.
*B05D 7/22* (2006.01)
*B05D 1/18* (2006.01)
*B01J 37/02* (2006.01)

(52) U.S. Cl. .................. 427/230; 427/235; 427/238
(58) Field of Classification Search .......... 427/230, 427/235, 238
See application file for complete search history.

(56) References Cited

U.S. PATENT DOCUMENTS

| | | | | |
|---|---|---|---|---|
| 2,625,273 A | * | 1/1953 | Schuller | 210/331 |
| 3,873,350 A | * | 3/1975 | Dwyer et al. | 427/378 |
| 4,039,482 A | * | 8/1977 | Hoyer et al. | 502/332 |
| 4,191,126 A | * | 3/1980 | Reed et al. | 118/50 |
| 4,208,454 A | * | 6/1980 | Reed et al. | 427/238 |
| 4,384,014 A | * | 5/1983 | Young | 427/294 |
| 4,550,034 A | * | 10/1985 | Shimrock et al. | 427/243 |
| 4,609,563 A | * | 9/1986 | Shimrock et al. | 427/8 |
| 5,866,210 A | * | 2/1999 | Rosynsky et al. | 427/294 |
| 5,948,683 A | * | 9/1999 | Koermer et al. | 436/37 |
| 5,953,832 A | * | 9/1999 | Rosynsky et al. | 34/403 |
| 6,478,874 B1 | * | 11/2002 | Rosynsky et al. | 118/63 |
| 7,374,792 B2 | * | 5/2008 | Rosynsky et al. | 427/231 |
| 7,476,417 B2 | * | 1/2009 | Dettling et al. | 427/238 |

FOREIGN PATENT DOCUMENTS

| JP | 60-225653 | 11/1985 |
|---|---|---|
| JP | 2006-21128 | 1/2006 |

* cited by examiner

*Primary Examiner*—William Phillip Fletcher, III
(74) *Attorney, Agent, or Firm*—Greenblum & Bernstein P.L.C.

(57) ABSTRACT

In a method of coating a substrate, inner walls of flow channels of the substrate are coated with a slurry. A plurality of flow channels each opened at both end faces are formed in the substrate. The method includes a step of storing a predetermined amount of slurry in a slurry container in which the end of the substrate, where the flow channels of the substrate are opened, can be inserted under pressure into the slurry container. A step of inserting the substrate with the end of the substrate being downward in the slurry container and dipping the substrate under pressure to the slurry liquid surface, and a step of extending the slurry along the inner wall of the flow channels by blow-opening the respective flow channels in a state of up-turning the slurry container together with the substrate.

7 Claims, 8 Drawing Sheets

Storing step P₁

Press-Inserting step P₂

Press-Inserting step P₂

Extending step P₃

Extending step P₃

Storing step $P_{11}$

Press-Inserting step $P_{12}$

Extending step $P_{13}$

Extending step $P_{13}$

Storing step P₂₁

Press-Inserting step P₂₂

Extending step P₂₃

Extending step P₂₃

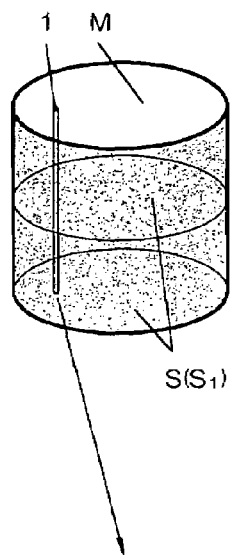
Fig. 6(a)
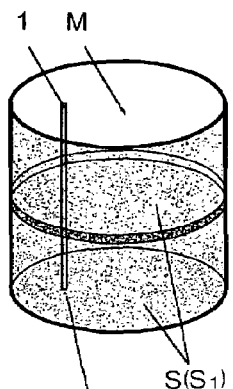
Fig. 6(b)
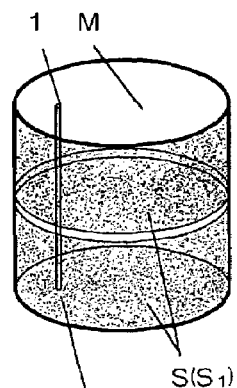
Fig. 6(c)
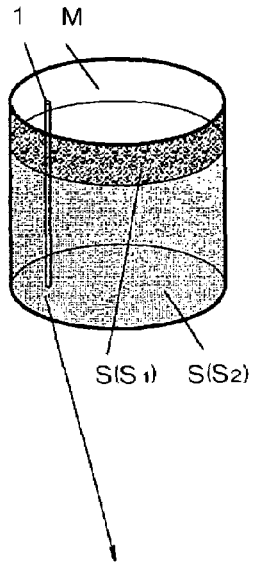
Fig. 6(d)
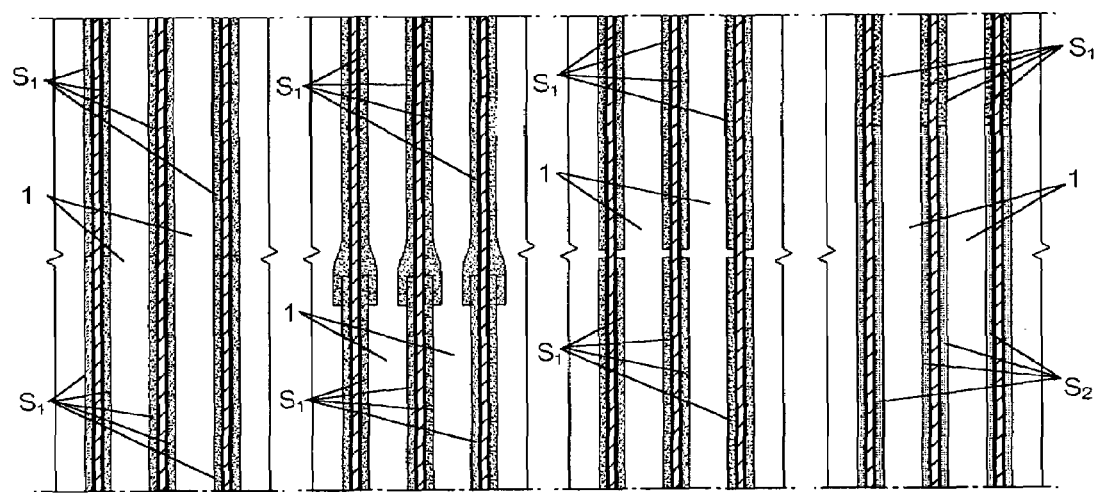

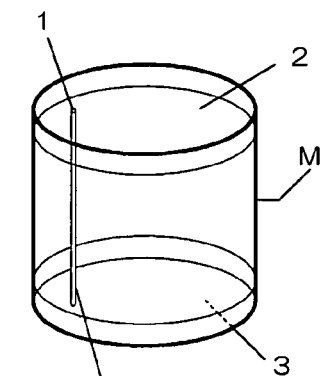
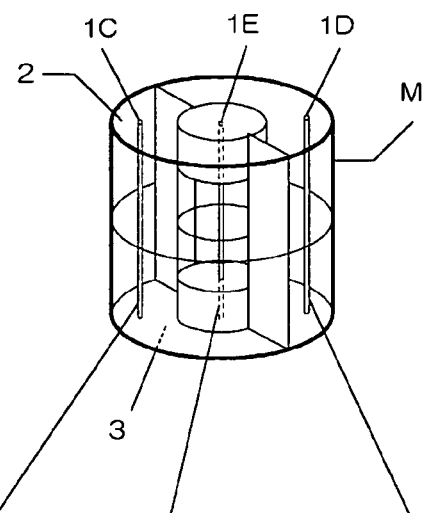
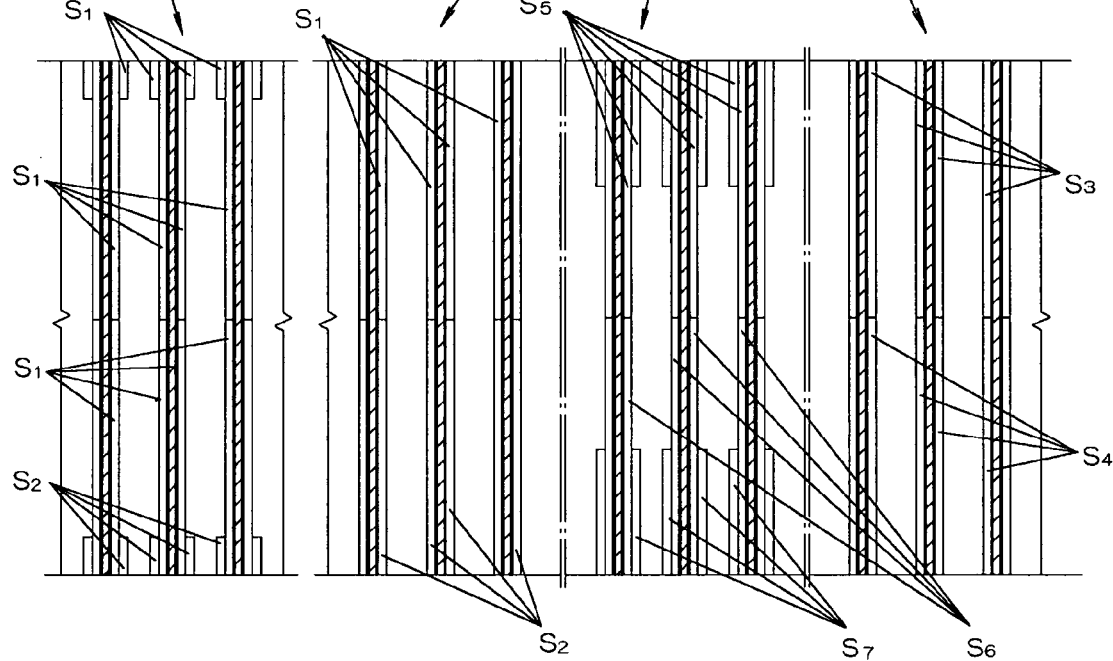
Fig. 7(a) Fig. 7(b)

SUBSTRATE COATING METHOD

BACKGROUND OF THE INVENTION

1. Field of the Invention

The present invention concerns an apparatus and a method of coating a substrate by coating a slurry and extending the coated slurry along a plurality of flow channels formed in parallel to a substrate and, more in particular, the method is suitable to preparation of a catalyst by coating a catalyst slurry to the inner wall of honeycomb flow channels formed to a monolith as a catalyst for use in an exhaust gas purifying catalyst.

2. Statement of Related Art

As a method of uniformly coating a catalyst slurry with no loss to the inner wall of the honeycomb flow channels formed in a monolith as a catalyst substrate, a vacuum coating method of sucking and coating a previously metered slurry has been known, for example, in JP No. 2737837 (Patent Document 1).

In this Patent Document 1, as shown in FIG. 8($a$), after supplying a previously metered slurry S in a slurry container 51, open ends of honeycomb flow channels 53 of a monolith M as a catalyst substrate are brought into contact with a liquid surface 52 of the slurry with the ends being downward, and the slurry S is sucked from the upper end openings of the honeycomb flow channels 53 by vacuum sucking, and the slurry S is introduced uniformly into each of the honeycomb flow channels 53, 53, . . . by a predetermined metered amount.

In this case, since no excess slurry is deposited to the monolith M, troubles of removing, recovering or recyclically using the surplus portion can be saved.

However, as shown in FIG. 8($b$), in the case of sucking the slurry under vacuum from the upper end of the monolith, since honeycomb flow channels 53B at the central portion suck more slurry S than the honeycomb flow channels 53A in the peripheral portion, this results in a problem that the flow channels can not be coated with a uniform coating length, for example, in a case of intending to coat the one-half length of the honeycomb flow channels 53 with the slurry S.

Further, in a case of controlling the vacuum degree for each of a plurality of honeycomb flow channels individually thereby controlling the amount of the slurry S to be entered, it is theoretically possible to suck an identical amount of the slurry S to the respective honeycomb flow channels and coat them each for a uniform length, but this complicates the mechanism and the control therefor and can not be practiced actually.

SUMMARY OF THE INVENTION

In view of the above, the present invention intends to improve the quality of a catalyst by enabling a previously metered slurry to be entered reliably and uniformly to each of the flow channels formed in parallel to a substrate.

The present invention has been achieved in a method of coating a substrate by coating inner walls of flow channels of the substrate with a slurry in which a plurality of flow channels each opened at both end faces are formed in parallel, wherein the method comprises a step of storing a predetermined amount of slurry in a slurry container in which the end of the substrate where the flow channels are opened can be inserted under pressure, a step of inserting the substrate with the end of the substrate being downward in the slurry container and dipping the same to the slurry liquid surface under pressure, and a step of extending the slurry along the inner wall of the flow channels by blow-opening the respective flow channels in a state of up-turning the slurry container together with the substrate.

According to the substrate coating method of the invention, the substrate is inserted under pressure, with one end where a plurality of flow channels are opened being downward, into the slurry container that stores a predetermined amount of a slurry and dipped to the liquid surface of the slurry.

In this case, since the slurry has a viscosity to some extent, it undergoes a large resistance when entering to the flow channels and, accordingly, the slurry is urged to the substrate end before the slurry enters the respective flow channels to smooth the liquid surface of the slurry and intrudes to each of the flow channels when the slurry is further inserted under pressure.

Particularly, in a case where the substrate is inserted under pressure as far as the bottom of the slurry container, the entire amount of the slurry stored in the slurry container can be filled for respective flow channels each by an identical amount.

Then, in a state where the slurry container is upturned together with the substrate and an air hole formed to the bottom of the slurry container is opened, when vacuum sucking is conducted on the side of the downwarded end of the substrate, air is supplied to the slurry container on the side of the upward end of the press-inserted substrate, or conducting them simultaneously, thereby blow-opening the respective flow channels by blowing of air, the slurry enters into all of the flow channels each by an identical amount and can be extended uniformly along the inner wall of each of the flow channels.

DESCRIPTION OF THE ACCOMPANYING DRAWINGS

FIG. 6 is an explanatory view showing an example of a catalyst manufactured according to the method of the invention;

FIG. 7 is an explanatory view showing another example of a catalyst manufactured according to the method of the invention.

PREFERRED EMBODIMENTS OF THE INVENTION

In the embodiments, a slurry metered previously can be entered uniformly into each of honeycomb flow channels reliably to improve the yield, with an extremely simple constitution.

The substrate coating method shown in FIG. 1 is a step chart showing the method of manufacturing an exhaust gas purifying catalyst for automobiles, etc. by entering and extending a catalyst slurry S by a pneumatic pressure into a plurality of honeycomb flow channels 1, 1, . . . formed in parallel in a monolith (catalyst substrate) M by way of a storing step $P_1$-press-inserting step $P_2$-extending step $P_3$ thereby coating inner walls $1w$ of the honeycomb flow channels.

Figure 2:
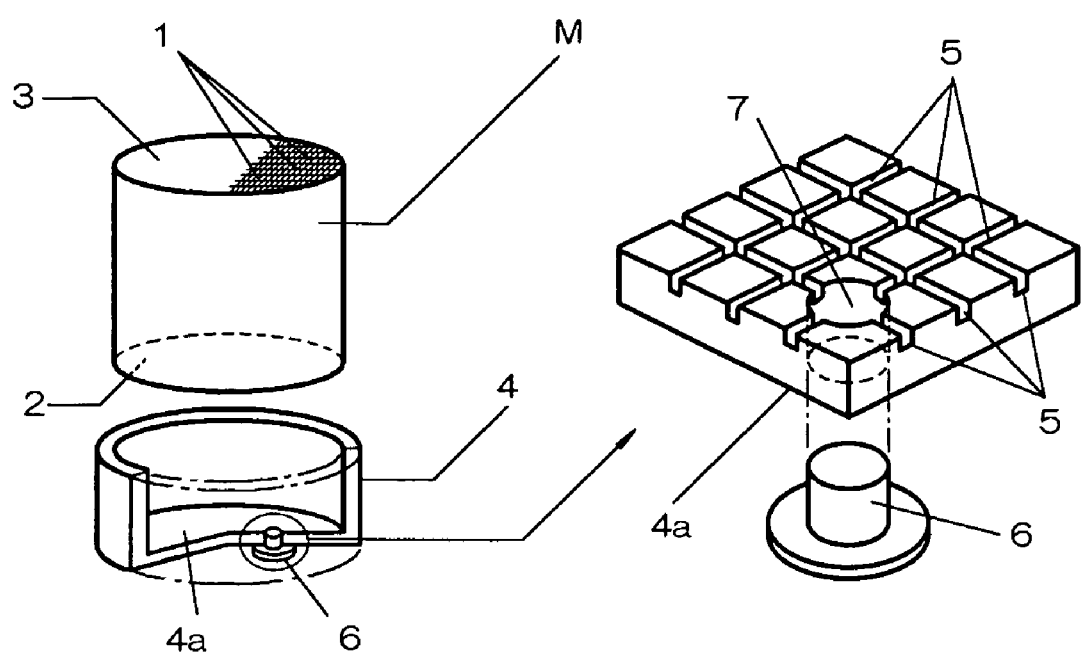
FIG. 2 is an explanatory view showing a slurry container used in the invention.

The monolith M is formed as a cylindrical shape, for example, at a length of about several centimeters to several tens centimeters, in which a plurality of honeycomb flow channels 1, 1, . . . each opened to both ends 2 and 3 of a cross sectional area of about 1 mm² as shown in FIG. 2.

Figure 1A:
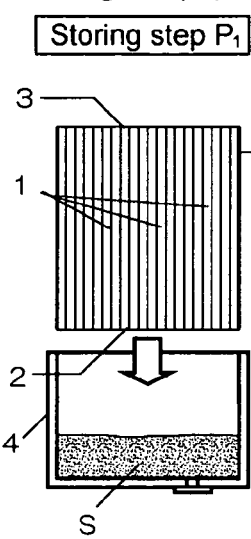
FIG. 1 is a step chart showing an example of a method according to the invention.

In the storing step $P_1$, a predetermined amount of the slurry S is stored in a slurry container 4 as shown in FIG. 1(a).

The slurry container 4 is formed into a tubular shape of a size fitting the ends 2 and 3 of the monolith M, in which air guide grooves 5 are formed longitudinally and laterally each at a predetermined pitch at the bottom 4a and an air hole 7 capable of opening and closing from the outside by attaching or detaching a plug 6 is disposed on the guide groove 5 as shown in FIG. 2.

Then, a slurry is metered and stored in the slurry container 4 by an amount necessary to be used upon coating each of the honeycomb flow channels 1, 1, . . . for a predetermined length of the monolith M.

Figure 1B:
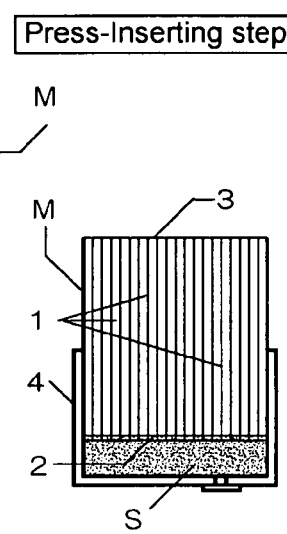

Then, in the press-inserting step $P_2$, as shown in FIG. 1(b), when the monolith M is press-inserted to the slurry container 4 with the end 2 on one side where the honeycomb flow channels 1, 1, . . . are opened being downward into the slurry container 4 and the end 2 is dipped to the liquid surface of the slurry, the liquid surface of the slurry is smoothed by being urged to the end 2.

Then, when the monolith M is further press-inserted, the trapped slurry S is forced to fill each of the flow channels 1, 1 . . . each by an identical amount.

Figure 1C:
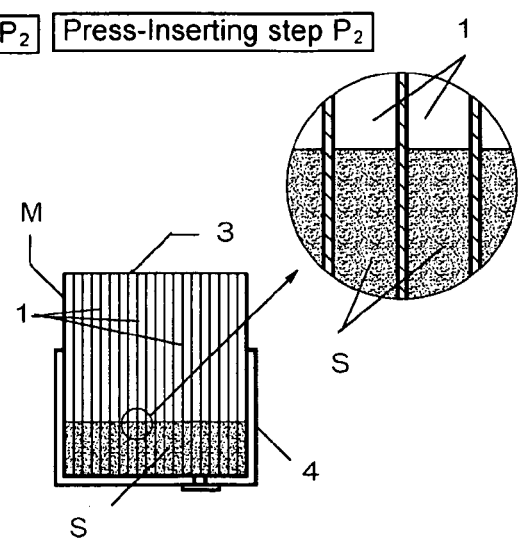

When the monolith M is further inserted under pressure as far as the bottom of the slurry container 4, as shown in FIG. 1(c), the slurry stored in the slurry container 4 is entirely filled into each of the flow channels 1, 1, . . . each in an identical amount.

Figure 1D:
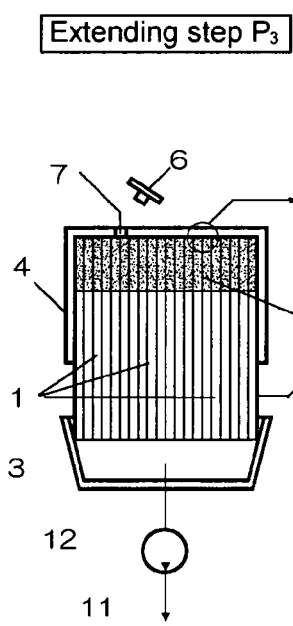
Figure 1E:
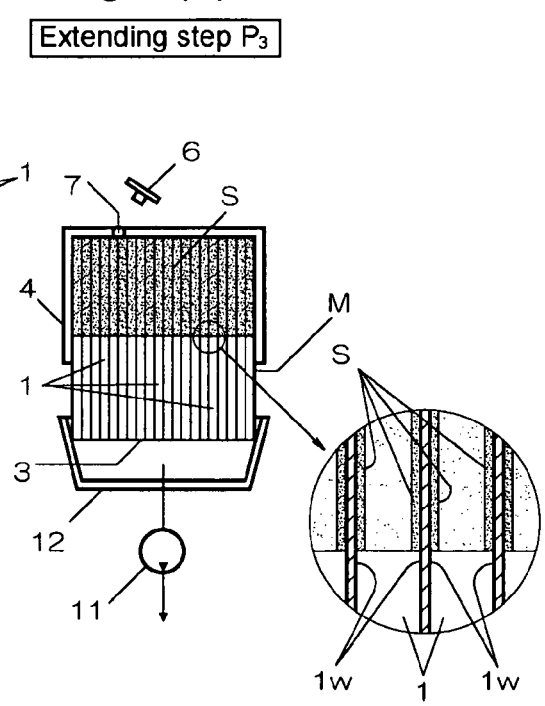

In the extending step $P_3$, as shown in FIG. 1(d), the monolith M is upturned to attach the other end 3 to a suction port 12 connected with a vacuum pump 11, a plug 6 for the air hole 7 formed to the bottom 4a of the slurry container 4 is pulled out and when each of the flow channels is blow-opened by sucking air under vacuum in each of the flow channels 1, 1, . . . , supplying air from the side of the slurry, or conducting both of them, the slurry S is extended for an equal length in each of the flow channel inner walls 1 was shown in FIG. 1(e) uniformly.

In this case, as shown in an enlarged view of FIG. 1(d), since the air guide grooves 5 are formed longitudinally and laterally each at a predetermined pitch on the bottom 4a of the slurry container 4, the air introduced from the air hole 7 is guided along the inner side of the bottom 4a to all of the honeycomb flow channels 1, and the honeycomb flow channels 1 are not closed at the bottom 4a of the slurry container 4.

After the extending step $P_3$ has been completed as described above, the substrate is dried or baked in the same manner as in usual to manufacture an exhaust gas purifying catalyst for automobiles.

FIG. 3 shows another substrate coating method according to the invention. Those portions in common with FIG. 1 carry identical reference numerals for which detailed descriptions are to be omitted.

This embodiment also provides a method of manufacturing an exhaust gas purifying catalyst for automobiles, etc. by way of the storing step $P_{11}$-press-inserting step $P_{12}$-extending step $P_{13}$ in this embodiment. However, coating is conducted in a state where the monolith M is not press-inserted as far as the bottom of the slurry container 4 and one end 2 is in contact with the slurry liquid surface.

Figure 3A:
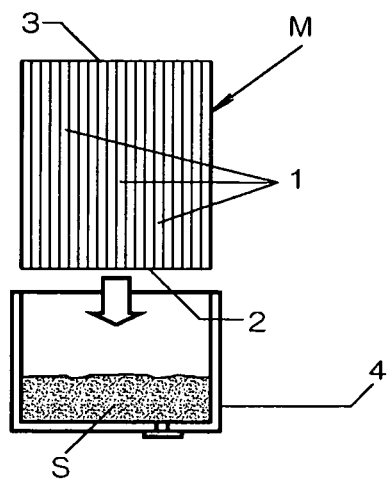
FIG. 3 is a step chart showing another coating method.
Figure 3B:
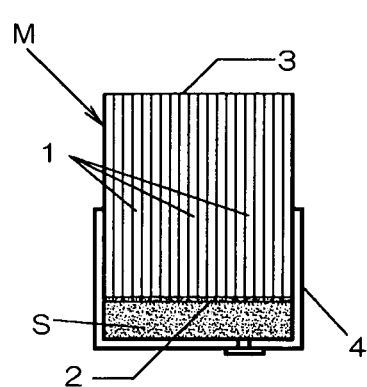
Figure 3C:
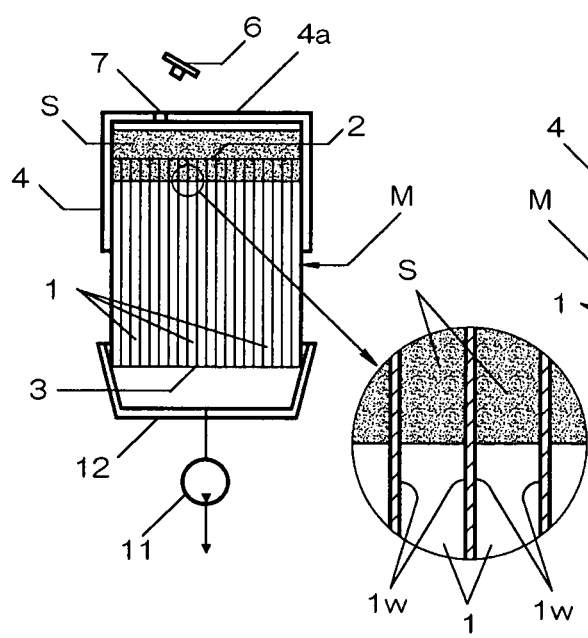
Figure 3D:
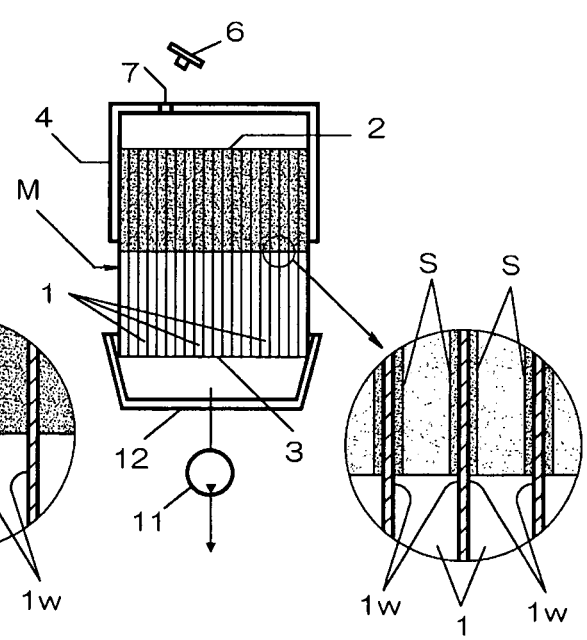

In the storing step $P_{11}$, as shown in FIG. 3(a), a predetermined amount of a slurry S is stored.

Then, in the press-inserting step $P_{12}$, the monolith M is press-inserted into the slurry container 4 with the one end 2 where the honeycomb flow channels 1, 1, . . . are opened being downward and the end 2 is dipped to the liquid surface of the slurry S.

Then, as the monolith M is press-inserted into the slurry container 4, the trapped slurry S is urged to enter each of the flow channels 1, 1, . . . . Since the depth of the slurry S is identical to any of the flow channels 1, 1, . . . , the slurry enters each by an identical amount.

Then, after press-inserting the monolith M to a predetermined level in the slurry container 4, it goes to the extending step $P_{13}$.

In the extending step $P_{13}$, the container 4 is upturned together with the monolith M and then each of the flow channels 1, 1, . . . is blow-opened to extend the slurry S along the flow channel inner wall 1w of the slurry.

In this case, when the other end 3 of the turned down monolith M is attached to a suction port 12 connected with a vacuum pump 11, and the plug 6 of the slurry container 4 is pulled out, air is introduced through the air hole 7 into the slurry container 4a.

Since air guide grooves 5 are formed longitudinally and laterally each at a predetermined pitch on the bottom 4a of the slurry container 4, air introduced from the air hole 7 prevails along the inner side of the bottom 4a and the slurry S tends to be peeled from the bottom 4a.

Then, since the slurry S remaining in the space between the monolith M and the slurry container 4 is at an identical height for each of the flow channels 1, 1, . . . , when it is sucked under vacuum, the slurry S enters into all the flow channels 1, 1, . . . each by an identical amount and is extended uniformly along each of the flow channel inner walls 1w and the coating length is also equal.

After the completion of the extending step $P_{13}$ as described above, the substrate is dried and baked in the same manner as usual to obtain an exhaust gas purifying catalyst for automobiles.

Figure 4:
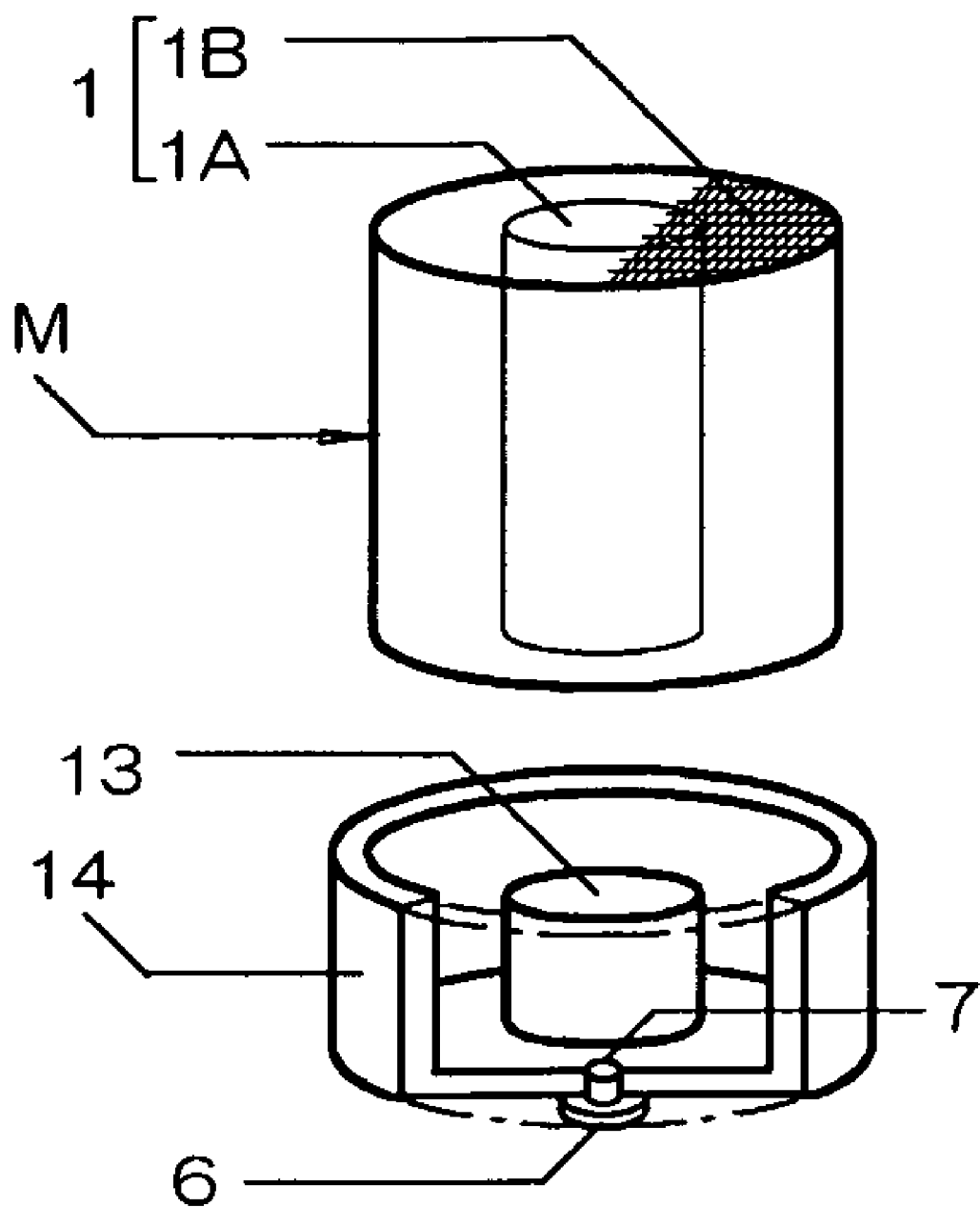
FIG. 4 is an explanatory view showing another slurry container.

In a case where it is not intended to coat the slurry S on specified flow channel(s) (for example, honeycomb flow channels 1A, 1A, . . . at a central portion) based on the designed slurry coating profile, a slurry container of a structure shown in FIG. 4 is used. In the slurry container 4, a packing 13 provided at a bottom 4a has a height higher than the liquid surface when a predetermined amount of the slurry S is stored and compressed under pressure below the liquid surfaced when the monolith M is press-inserted.

Figure 5A:
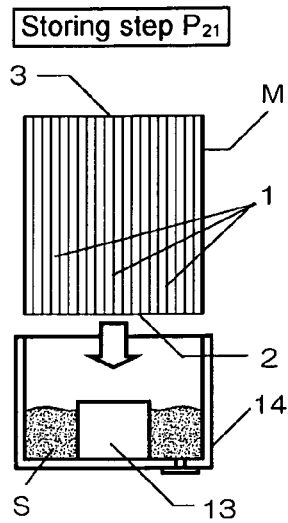
FIG. 5 is a step chart showing the coating method using the same.

In the storing step $P_{21}$, as shown in FIG. 5(a), when a predetermined amount of a slurry S is stored, the top of the packing 13 is exposed above the liquid surface.

Figure 5B:
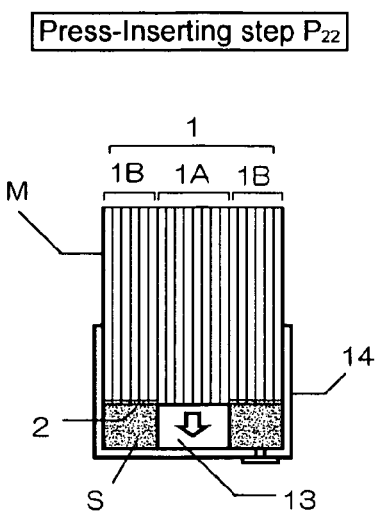

Then, when the monolith M is press-inserted into the slurry container 4 in the press-inserting step $P_{22}$, as shown in FIG. 5(b), the packing 13 abuts against the central portion of the honeycomb flow channels 1A, 1A, . . . to close the openings thereof.

Further, as the packing 13 is compressed under pressure as far as below the liquid surface of the slurry S, the slurry S is urged to the end 2 before it enters each of the flow channels 1B, 1B . . . which are not closed by the packing 13 to smooth the liquid surface and then the trapped slurry S is forced to enter the flow channels 1B, 1B . . . uniformly.

Figure 5C:
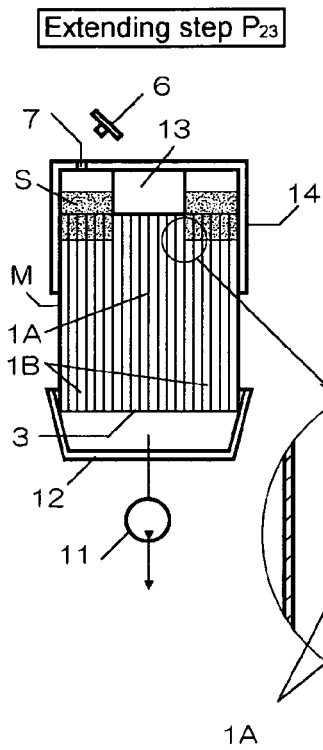
Figure 5D:
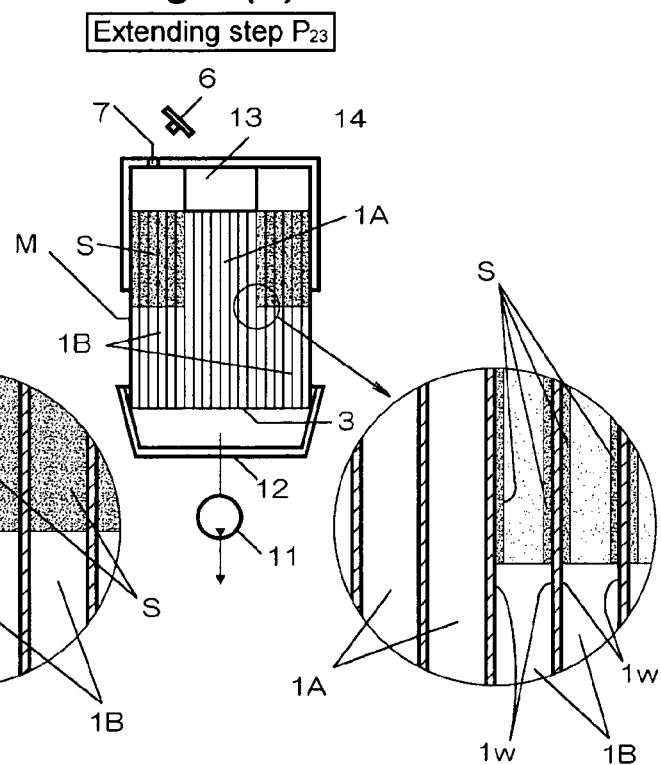
Figure 8A:
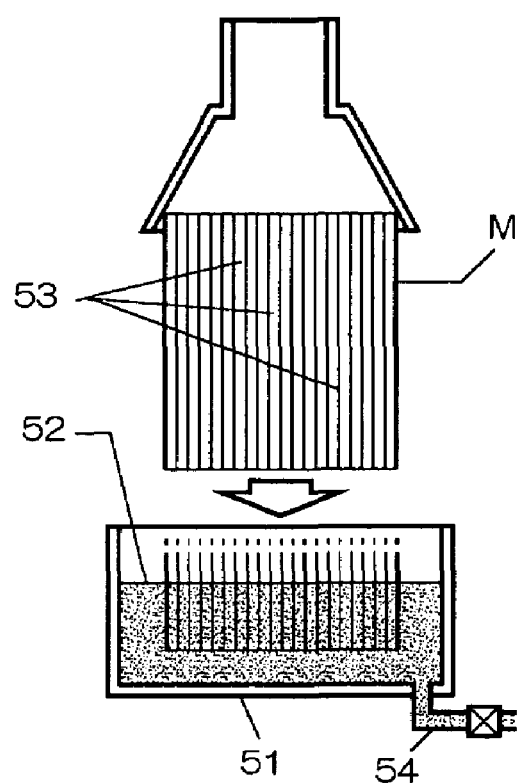
FIG. 8 is an explanatory view showing the prior art.
Figure 8B:
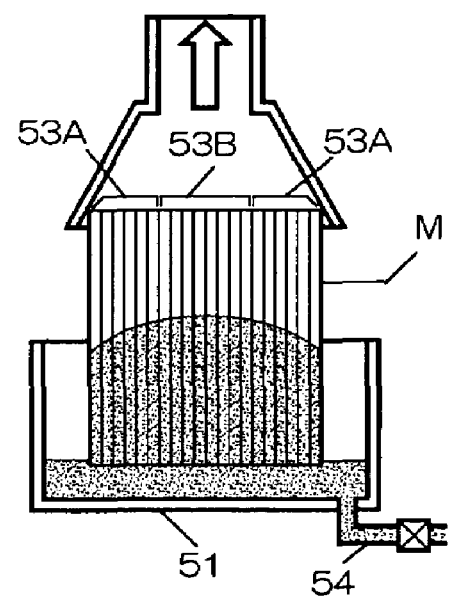

Then, in the same manner as described above, the process goes to the extending step $P_{23}$ and, after upturning the monolith M as shown in FIG. 5(c), when the flow channels 1B are blow-opened as shown in FIG. 5(d), the slurry S is uniformly extended along the flow channels 1B, 1B, . . . in the peripheral portion not closed by the packing 13.

FIG. 6 shows an example of a catalyst formed by combining the methods of the invention.

For example, in a case of coating the slurry S over the entire length of the honeycomb flow channels 1, 1, . . . the slurry S may be metered by a predetermined amount capable of coating the entire length and then filled in the slurry container 4 but, alternatively, the slurry S may also be coated from both ends 2 and 3 of the monolith M each for a one-half length.

That is, a slurry S coated for one-half length from the openings on one end of the honeycomb flow channels 1 by press-inserting the monolith M from the end 2 on one side to the slurry container 4 that stores the slurry S by repeating the storing step $P_1$, $P_{11}$-press-inserting step $P_2$, $P_{12}$-extending step $P_3$, $P_{13}$. Then, the monolith M is press-inserted from the side of the other end 3 into the slurry container 4 that stores the slurry S, and the slurry S is coated for one-half length from the opening on the other end of the honeycomb flow channels 1 in the same manner. Thus, the slurry S can be coated over the entire length of the honeycomb flow channel 1.

In this case, by increasing or decreasing the amount of the slurry stored in the slurry container 4, a slurry $S_1$ of an identical kind is coated uniformly from both ends, the slurry S can be overlapped as shown in FIG. 6(b). Alternatively, the slurry S can be coated with a gap therebetween as shown in FIG. 6(c), or slurries $S_1$ and $S_2$ of different exhaust gas purifying characteristics can be coated respectively from both ends at an optional length ratio as shown in FIG. 6(d).

Further, it is possible to coat a slurry $S_1$ over the entire length of honeycomb flow channels 1, 1, . . . by repeating the storing step $P_1$, $P_{11}$, or $P_{21}$-press-inserting step $P_2$, $P_{12}$, or $P_{22}$-extending step $P_3$, $P_{13}$, or $P_{23}$ and then coat the identical kind of slurry $S_1$ on the side of one end 2 of the monolith M in stack thereby partially changing the film thickness of the slurry $S_1$ or, alternatively, it is possible to coat a different kind of a slurry $S_2$ on the side of the other end 3 of the monolith M in stack thereby providing a laminate structure as shown in FIG. 7(a).

Furthermore, it is possible to obtain a coating profile as shown in FIG. 7(b) by using a slurry container 14 provided with a packing 13 of an optional shape and repeating the storing step $P_{21}$-press-inserting step $P_{22}$-extending step $P_{23}$.

In this case, honeycomb flow channels 1C for one of the peripheral portion of the monolith M bisected diametrically are coated with a slurry $S_1$ and a slurry $S_2$ at a predetermined ratio of length (for example, each by 1/2), honeycomb flow channels 1D thereof are coated with a slurry $S_3$ and a slimy $S_4$ at a predetermined ratio of length (for example, each by 1/2), and honeycomb flow channels 1E are coated with a slurry $S_5$ and slurry $S_7$ coated respectively on both ends of undercoated slurry $S_5$ and $S_6$.

As described above, according to this embodiment, since catalysts of various coating profiles can be manufactured not restricted only to the examples described above, it has an effect of enhancing the degree of freedom for the design of the coating profile.

Further, since the slurry can be distributed reliably each in an identical amount to each of the flow channels by press-inserting the substrate into the slurry container, it can provide an excellent effect capable of uniformly extending the slurry along the inner wall of each of the flow channels.

INDUSTRIAL APPLICABILITY

The present invention is suitable to an application use of coating a catalyst slurry to the inner wall of honeycomb flow channels formed as a monolith or the like as a catalyst substrate of an exhaust gas purifying catalyst for automobiles or the like thereby forming the catalyst.

What is claimed is:

1. A method of coating a substrate by coating inner walls of flow channels of the substrate with a slurry in which a plurality of flow channels each opened at both end faces are formed in parallel, wherein the method comprises
    a step of storing a predetermined amount of slurry in a slurry container in which the end of the substrate, where the flow channels of the substrate are opened, can be inserted under pressure into the slurry container,
    a step of inserting the substrate with the end of the substrate being downward in the slurry container and dipping the substrate under pressure to the slurry liquid surface, and
    a step of extending the slurry along the inner wall of the flow channels by blow-opening the respective flow channels in a state of up-turning the slurry container together with the substrate.

2. A substrate coating method according to claim 1, comprising opening an air hole formed to the bottom of the container in the extending step and blow-opening each of the flow channels.

3. A substrate coating method according to claim 1, wherein a packing having a height greater than a height of the liquid surface of the slurry, the packing configured to be compressed under pressure so that the height of the packing is compressed to extend as far as below the liquid surface, and the packing being positioned at the bottom of the slurry container so as to correspond to at least one specified flow channel which is not intended to be coated with the slurry and, when the substrate is inserted into the slurry container in the inserting step, the substrate is dipped to the liquid surface of the slurry while abutting the end to the packing thereby closing the at least one specified flow channel.

4. A substrate coating method according to claim 1, wherein identical or different kinds of slurries are coated in stack in plurality by repeating the storing step, the inserting step, and the extending step thereby coating identical or different kind of slurries in plurality.

5. A substrate coating method according to claim 1, wherein the substrate is inserted on the side of one end thereof into the slurry container that stores the slurry and the slurry of a predetermined length is coated from the openings on one end by repeating the storing step, the inserting step and the extending step, and then, the substrate is inserted on the side of the other end thereof to the slurry container stores identical or different kind of slurry thereof coating a predetermined length of the slurry from the openings of the flow channels on the other end thereof.

6. A substrate coating method according to claim 1, wherein the slurry comprises a catalyst slurry coated on the inner wall of the flow channels of a catalyst substrate to form a catalyst substrate of an exhaust gas purifying catalyst.

7. A substracte coating method according to claim 1, wherein the blow-opening of the respective flow channels comprise opening an air hole and vacuuming the slurry.

* * * * *